Jan. 12, 1926.
G. MATZ
1,569,517
SELF RAILING WHEEL
Filed March 24, 1924
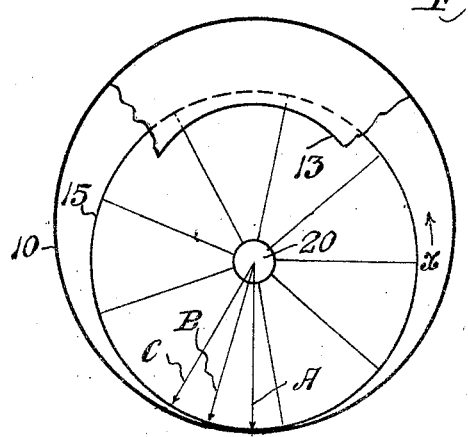
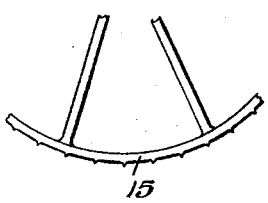
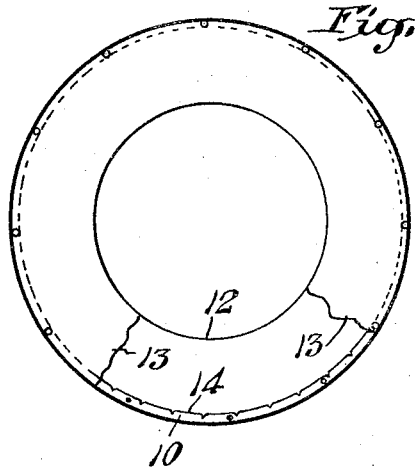
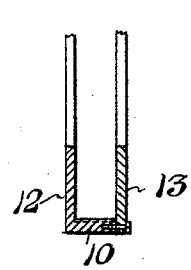
George Matz
INVENTOR Patented Jan. 12, 1926.

1,569,517

UNITED STATES PATENT OFFICE.

GEORGE MATZ, OF NEW YORK, N. Y.

SELF-RAILING WHEEL.

Application filed March 24, 1924. Serial No. 701,425.

*To all whom it may concern:*

Be it known that I, GEORGE MATZ, a citizen of Russia, and a resident of New York city, Bronx County, and State of New York, United States of America, have invented certain new and useful Improvements in Self-Railing Wheels, of which the following is a specification.

This invention relates to wheels.

Ordinarily vehicle wheels roll on a track or road surface. Under such circumstances only one of the contacting elements moves, namely, the wheel and it will be evident that there must be considerable friction between the wheel and the surface on which it is rolling in order to insure the necessary traction.

This invention has for its salient object to provide a wheel so constructed that the wheel will provide its own track and the desired traction can be obtained under all conditions of use.

Another object of the invention is to provide a wheel construction by means of which the frictional resistance between the wheel and road surface is reduced to a minimum.

Further objects of the invention will appear from the following specification taken in connection with the drawings, which form a part of this application, and in which—

Fig. 1 is an elevational view partly broken away illustrating diagrammatically a wheel constructed in accordance with the invention.

Fig. 2 is an elevational view partly broken away showing the construction of the rim.

Fig. 3 is a transverse sectional elevation through the rim, and

Fig. 4 is an elevational view broken away showing a portion of the wheel construction.

The invention briefly described consists of a wheel construction comprising a rim and a wheel positioned in the rim and adapted to roll on the rim. Means is provided for retaining the wheel in position in the rim. The diameter of the rim is greater than the diameter of the wheel and thus as the structure rotates the wheel can rotate on the rim as the rim rotates on the ground or road surface. Further details of the invention will appear from the following description.

In the form of the invention illustrated in the drawings the rim 10 has flanges 12 and 13 formed thereon or connected thereto. In the particular embodiment of the invention shown the flange 13 is secured to the rim after placing the wheel within the rim. The inner periphery 14 of the rim may be roughened as shown in Fig. 2 to coact with the roughened outer periphery of the wheel (see Fig. 4).

A wheel 20 is mounted within the rim and is adapted to roll on the inner periphery of the rim.

From the showing in Fig. 1 it will be noted that the flanges 12 and 13 are greater in radial width than the difference between the diameters of the wheel and the rim. The flanges will, therefore, retain the wheel in position within the rim.

In Fig. 1 arrow A illustrates the radius of the wheel on which the load is being supported when the wheel is in the position illustrated. As the wheel rotates in the direction of the arrow $x$ the load will be shifted successively to the radius B and the radius C.

By means of the structure described backsliding and resistance of the wheel to a forward movement are reduced to a minimum and, furthermore, the structure will result in the obtaining of sufficient friction even though the road surface on which the wheel is being used is poor or uneven.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claim.

What I claim is:

A driving wheel structure comprising an outer ring forming a rim for engagement with the surface on which the wheel structure is used, a rigid wheel mounted to roll in said outer rim and to transmit the drive thereto, said wheel comprising a hub, a rim and means connecting the hub and wheel rim, said wheel rim having a diameter less than the outer rim diameter and flanges, the radial width of which is greater than the difference between the outer rim and wheel diameters, on said outer rim for retaining the wheel within the outer rim, one of said flanges being formed on said rim and the other of said flanges being removably attached thereto, the outer peripheral surface of the wheel and inner surface of the outer rim being roughened.

Dr. GEORGE MATZ.